United States Patent [19]

Kubiatowicz

[11] 4,343,978
[45] Aug. 10, 1982

[54] STRUCTURE FOR USE IN MICROWAVE COOKING

[76] Inventor: James F. Kubiatowicz, 1630 Rice Creek Rd., Minneapolis, Minn. 55432

[21] Appl. No.: 208,050

[22] Filed: Nov. 18, 1980

Related U.S. Application Data

[63] Continuation of Ser. No. 14,304, Feb. 21, 1979, abandoned.

[51] Int. Cl.³ .............................................. H05B 6/80
[52] U.S. Cl. ............................... 219/10.55 E; 99/444; 426/243
[58] Field of Search ................ 219/10.55 E, 10.55 R, 219/10.55 M; 426/107, 241, 243; 99/400, 422, 425, 426, 427, 444, 446, 451, DIG. 14; D7/41, 85, 130

[56] References Cited

U.S. PATENT DOCUMENTS

| | | |
|---|---|---|
| 166,120 | 7/1875 | Malin .................................. 99/425 |
| D. 227,132 | 6/1973 | Kelly ..................................... D7/85 |
| D. 243,649 | 3/1977 | Carbary ............................... D7/129 |
| D. 257,115 | 9/1980 | Anderson ..................... 219/10.55 E |
| 411,670 | 9/1889 | McCaughey .......................... 99/425 |
| 1,301,197 | 4/1919 | Tully .................................... 99/425 |
| 3,113,505 | 12/1963 | Keppler ............................... 99/444 |
| 3,224,357 | 12/1965 | Rubens ................................ 99/259 |
| 3,407,723 | 10/1968 | Varkala ................................ 99/349 |
| 3,466,998 | 9/1969 | Musgrove ............................. 99/349 |
| 3,587,445 | 6/1971 | Kircher ................................ 99/331 |
| 3,593,648 | 7/1971 | Walters ................................ 99/332 |
| 3,685,434 | 8/1972 | Harrison .............................. 99/425 |
| 3,713,379 | 1/1973 | Gordy .................................. 99/349 |
| 3,717,083 | 2/1973 | Karapetian .......................... 99/450 |
| 3,747,506 | 7/1973 | Belgard ................................ 99/349 |
| 3,946,187 | 3/1976 | MacMaster et al. ......... 219/10.55 E |
| 3,994,212 | 11/1976 | Wong ................................... 99/444 |
| 4,064,797 | 12/1977 | Forlani ............................ 99/426 X |
| 4,074,102 | 2/1978 | Asen ............................. 219/10.55 E |
| 4,112,833 | 9/1978 | Oda et al. ............................ 99/425 |
| 4,121,510 | 10/1978 | Frederick ............................. 97/425 |
| 4,122,324 | 10/1978 | Falk ............................. 219/10.55 E |
| 4,140,889 | 2/1979 | Mason, Jr. et al. ......... 219/10.55 E |

OTHER PUBLICATIONS

Microwave Accessories, Ad Brochure from NUPAC, Aug. 12, 1977.

Primary Examiner—Arthur T. Grimley
Attorney, Agent, or Firm—William L. Huebsch

[57] ABSTRACT

A structure for cooking in a microwave oven strips of food such as bacon that gives off liquid in the cooking process. The structure comprises (1) a nonmetallic base portion having a top surface and a cavity recessed from the top surface of a size adapted to contain the liquid released from the strips; and (2) a nonmetallic support portion defining a narrow support surface positioned directly over the cavity over which the strips of food can be hung as they are cooked so that liquid from the strips drains into the cavity.

8 Claims, 5 Drawing Figures

STRUCTURE FOR USE IN MICROWAVE COOKING

BACKGROUND OF THE INVENTION

While microwave ovens provide a fast, efficient means for cooking, they present certain problems when they are used to cook strips of food such as bacon which give off liquid such as grease while they are being cooked. The liquid must be collected, and the microwave cooking process can cause grease to fly onto the inside surfaces of the oven. Thus one method recommended by microwave oven manufacturers for cooking bacon has been to position the bacon between layers of paper towels on a paper plate during cooking so that the paper towels will contain and absorb the grease. This method is time consuming and messy to use, however, and results in an unsightly mass of grease-soaked paper towels that must be disposed of. While trays having channels in their surfaces leading to a reservoir along one edge have also been provided to try to manage the liquids resulting from cooking bacon in a microwave oven, these do not provide the level of protection that may be desired against splattering grease, and they must be emptied of liquid and cleaned for reuse, which is a time-consuming and messy process.

SUMMARY OF THE INVENTION

The present invention provides a disposable structure for cooking in a microwave oven strips of food such as bacon that give off liquid in the cooking process, which structure is convenient and easy to use, restricts splattering of grease against the oven surfaces during the cooking process, and affords very easy cleanup and disposal of the liquid after the strips of food have been cooked.

According to the present invention, there is provided a structure comprising (1) a nonmetallic base portion having a top surface and a cavity recessed from the top surface of a size adapted to at least contain liquid released from the strips; and (2) a nonmetallic support portion having a narrow support surface and being adapted to be mounted on the base portion with its narrow support surfaces generally horizontal and positioned over and spaced from the bottom of the cavity at a distance of at least about one half of the length of the strip material. To use the assembly, a strip of food is hung over the support surface with the end portions of the strip extending toward the cavity. When the microwave oven is activated, the liquid released from the strip material will either run down the strip or will impinge upon adjacent parts of the structure and run down into the cavity where it is collected. The cooked strip material can then be removed and the structure with the collected liquid can be disposed of.

In one embodiment the structure includes a plurality of support portions, and the base portion has parallel side walls. The support portions each are generally T-shaped and include a bottom part having opposite edges spaced to extend along the inner surfaces of the side walls, and a top part defining the support surface on its side opposite the bottom part and being wider than and extending past the spaced edges of the bottom part to engage and be supported by the top surface of the base portion with the support portion extending transversely between the side walls of the base portion.

In another embodiment the support portion is a ladder-like structure having a plurality of spaced parallel parts defining support surfaces over which the strips of food may be hung, and having parts at the opposite ends of the parallel parts adapted to be supported on the top surface of the base portion.

In yet another embodiment the support portion includes two rectangular planar portions joined to each other and adapted to be folded along a common edge so that the edge will define the support surface over which the strips of food may be hung. The planar portions are adapted to be disposed at an acute angle and to have their edges opposite the common edge supported on the base portion within the cavity to provide a generally A-shaped support portion.

With any of these embodiments the base portion may be a unitary liquid-tight vessel, or may comprise a stiff support structure defining the shape of the cavity and a bag adapted to contain high temperature liquids, which bag lines the support structure, defines the inside surface of the cavity, and collects the liquid. After cooking is completed and the strips of food are removed, the support portions may be put into the cavity and the cavity may be closed by capping the vessel or by tying closed the bag to facilitate neat disposal of the assembly and collected liquids.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
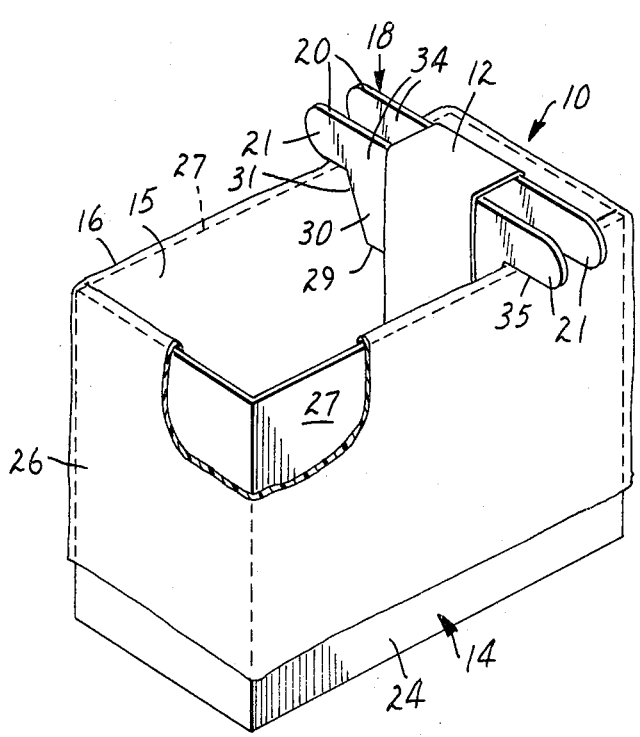
FIG. 1 is a perspective view of one embodiment of a structure according to the present invention for cooking strips of food such as bacon in a microwave oven, which view has a part broken away to show detail and shows a strip of food over a support portion included in the structure.

Referring now to the drawing, there is shown an a structure according to the present invention for cooking strips of food or bacon 12 in a microwave oven (not shown), which structure is generally designated by the numeral 10.

The structure 10 comprises a nonmetallic base portion or container 14 having a cavity 15 recessed from a top surface 16 of the container 14, which cavity 15 is adapted to at least contain the quantity of hot liquids released from the strips of bacon 12 during cooking; and a plurality of separate, generally T-shaped nonmetallic support portions 18, each having a narrow support surface 20 defined by two edges of the support portion 18 over which a strip of food or bacon 12 may be supported at its central portion, and projecting ears 21 adapted to be supported on the top surface 16 of the container 14 with the support portion 18 extending transverse of the cavity 15 so that the end portions of the strip of bacon 12 extend into the cavity 15. A plurality of the support portions 18 may be supported on the top surface 16 of the container 14 with their narrow support edge surfaces 20 generally horizontal, spaced apart, directly over the cavity 15 and spaced from the bottom of the cavity 15 at a distance at least one half the length of the strips of bacon 12 so that a plurality of strips of bacon 12 may be supported on the assembly 10.

To cook strips of bacon 12 with the assembly 10, the user first drapes each of the strips of bacon 12 to be cooked over a different one of the support portions 18 with the support surface 20 of the portion 18 transverse of the strip 12 and with about equal length end portions of the strip 12 extending down both sides of the support portion 18. He places the support portions 18 in the cavity 15 in spaced relationship, positions the assembly 10 and the strips of bacon 12 supported thereby in a microwave oven, and activates the oven. During cooking, hot liquids released from the bacon 12 will be retained in the cavity 15 by the adjacent strips of bacon 12, support portions 18, or walls of the container 14 even if the hot liquids are propelled away from the surface of the bacon by the cooking process; and the hot liquid will run down the bacon 12, support portions 18, and wall of the container 14 to the bottom of the cavity 15 where the liquid will be contained.

It has been found best to cook the bacon for about $\frac{3}{4}$ minute per slice, check the bacon, and cook again (if needed) for up to another $\frac{1}{4}$ minute per slice. When cooked, the bacon strips are separated with a fork and removed from the support portions 18. The structure 10 with its collected liquid can then be conveniently disposed of as described below.

The base portion or container 14 comprises a stiff, rectangular, open-topped support structure 24 having side and bottom walls of a stiff, inexpensive material such as 15 point solid paper carton stock, which support structure 24 may have one of a number of known configurations so that it can be stored flat and folded into the rectangular shape illustrated prior to use. Also included in the base portion 14 is a bag 26 adapted to contain high temperature liquids (e.g., the bags commercially designated "Brown-In-Bag" commercially available from the Reynolds Metal Co., Richmond, Va.) of a size adapted to removably line the support structure 24, with a portion of the bag adjacent its opening folded down around side walls of the support structure 24. After the strips of bacon 12 have been cooked, the used support portions 18 may be inserted into the cavity 15 and the bag 26 removed from the support structure 24 and tied closed to facilitate neat disposal of the support members 18, collected liquid, and bag 26; whereupon the support structure 24 may be disposed of, or, if desired, may be reused with a new bag 26 and new support portions 18.

Figure 2:
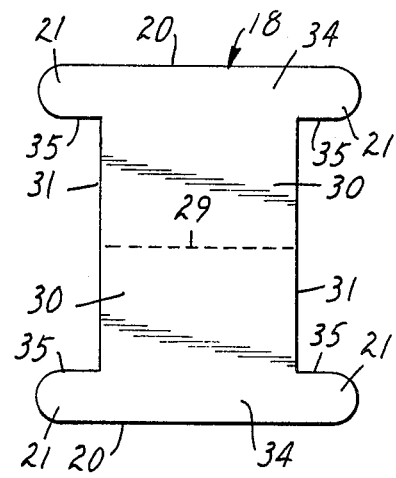
FIG. 2 is a plan view of one of a plurality of support portions included in the structure of FIG. 1 before it is bent to a U-shape for use.
Figure 3:
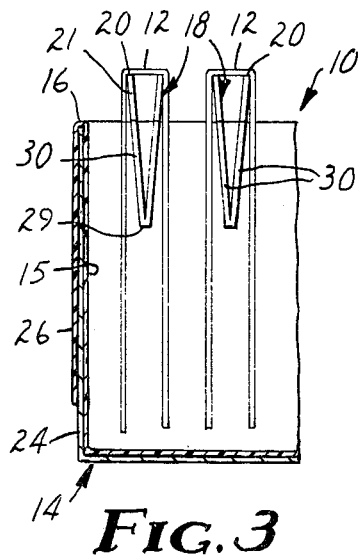
FIG. 3 is a vertical sectional view of the structure shown in FIG. 1 but which shows two support portions.

As is best seen in FIGS. 1, 2 and 3, each of the generally T-shaped support portions 18 is formed from a single sheet of material adapted to be folded into a V-shape around a central fold line 29. When folded, each support portion 18 includes a generally rectangular bottom part 30 having opposite spaced edges 31 spaced to extend closely along the inner surfaces of parallel side walls 27 of the container 14 to center the support portion 18 with respect to the walls 27; and a top part 34 wider than the bottom part and including the ears 21 which extend past the opposite edges 31 of the bottom part 30 and provide aligned edge surfaces 35 opposite the support edge surface 20, which aligned edge surfaces 35 are adapted to engage and be supported on the top surface 16 of the container 14. The edges of the top part 34 defining the support surface 20 for the support portion 18 will separate slightly due to the resilience in the material of the support portion 18 at its fold line 29. This provides a width for the support surface 20 which is somewhat greater than twice the thickness of the material, which is an advantage in that it tends to separate the portions of the bacon 12 extending down from the support member 18. Also, such separation causes the edge surfaces 35 on each side of the support portion 18 to be spaced along the top surface 16 of the adjacent side walls 27, which adds to the vertical stability of the support portion 18 on the base portion 14. Preferably the support portions 18 are die cut from a stiff fibrous material such as 15 point solid bleached oil- and grease-resistant paper carton stock.

The size of the container 14 should be sufficient to contain all of the liquid released from the amount of bacon cooked for a family meal, and preferably should contain that liquid in less than about one half its volume to restrict spillage of the liquid when the container 14 is inadvertently tipped during use. A container 14 having a cavity 15 about 7 inches long, $2\frac{1}{2}$ inches wide and 6 inches high has been found suitable for use to cook many bacon strips.

The bottom parts 30 of the support portions 18 should have about the same width as the cavity 15. The top part 34 of the support portions 18 should have a height sufficient to provide the needed structural strength for its ears 21, but which is not so high that a significant amount of liquid can escape the parts of the bacon projecting above the container on the outer support portions 18.

Figure 4:
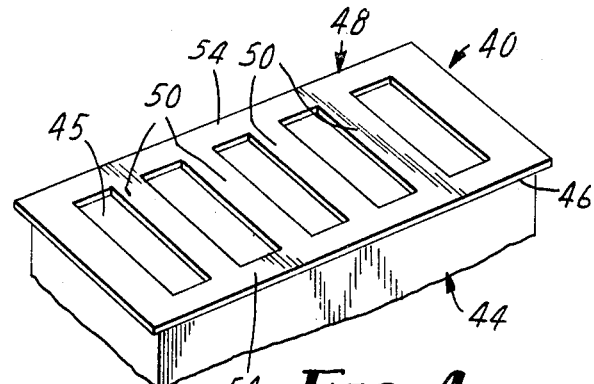
FIG. 4 is a fragmentary perspective view of one alternate embodiment of the structure according to the present invention.

FIG. 4 illustrates an alternate embodiment for a structure according to the present invention which is generally designated by the reference numeral 40 and which can be used to cook strips of bacon 12 in a microwave oven in a manner similar to that described above with respect to the structure 10. The structure 40 includes a base portion or container 44 defining a cavity 45 recessed from a top surface 46 thereof, which container 44 includes a stiff support structure defining the shape of the cavity and a bag adapted to contain high temperature liquids sized to removably line the support structure, which are essentially identical to the support structure and bag of the container 14; and a support portion 48 having spaced parallel narrow support surfaces 50 adapted to support strips of bacon 12 at their central portions with their end portions extending into the cavity 46. The support portion 48 is a ladder-like structure in which the support surfaces 50 are defined by parallel spaced parts, and includes parts 54 at the opposite ends of its parts defining the support surfaces 50 adapted to be supported on the top surface 46 of the container 44. While the support portion 48 can be made of a disposable material such as paper carton stock, such material may not provide as much structural strength for the support portion 48 as is desired. Thus it may be preferable to make the support portion 48 from a stiff polymeric material and to reuse it so that only the bag included in the container 44 is disposed of with the liquid after the structure 40 is used.

Figure 5:
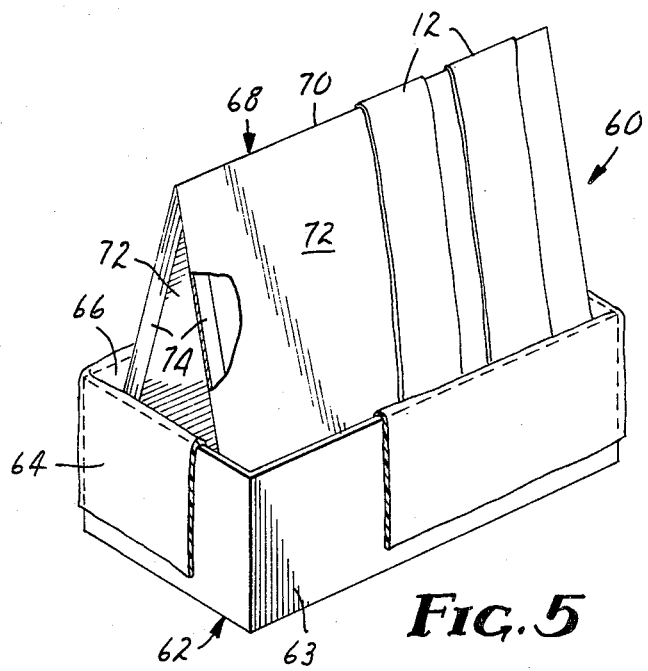
FIG. 5 is a perspective view of another alternate embodiment of the structure according to the present invention having parts broken away to show details.

FIG. 5 illustrates another alternative embodiment for a structure according to the present invention which is generally designated by the reference numeral 60 and which can be used to cook strips of bacon 12 in a microwave oven in a manner similar to that described above with respect to the structure 10.

The structure 60 includes a base portion or container 62 defining a cavity 66 recessed from a top surface thereof, which container 64 includes a stiff support structure 63 defining the shape of the cavity 66 and a bag 64 adapted to contain high temperature liquids sized to removably line the support structure, which are essentially the same as the support structure 24 and bag 26 in the container 14; and a support portion 68 having a narrow support surface 70 adapted to support strips of bacon 12 at their central portion over the cavity 66. In the structure 60, the support portion 68 includes two rectangular planar parts 72 joined to each other and adapted to be folded along their common edge which defines the support surface 70. The planar parts 72 are adapted to be disposed at an acute angle relative to each other and have their edges opposite the support surface 70 supported on the base portion 62 within the cavity 66.

The support portion 63 is preferably made of a stiff fibrous material such as 15 point solid bleached oil- and grease-resistant paper carton stock, and may, as illustrated, have folded-over edge portions 74 extending normal to the support surface 70 to add structural strength to the support portion 68.

I claim:

1. A disposable structure adapted for cooking strips of food of a predetermined length such as bacon that give off liquids in the cooking process in a microwave oven, said structure comprising:
   a nonmetallic base portion having a top surface and a cavity recessed from said top surface of a size adapted to at least contain liquid released from the strips; said base portion comprising a stiff paper support structure having side walls defining the shape of said cavity, and a flexible bag adapted to contain high temperature liquids removably lining the support structure to define the inside surface of said cavity; and
   a stiff paper support portion separable from said base portion, having a narrow support surface, and having parts adapted to engage and be supported on said base portion with said narrow support surface generally horizontal and positioned over and spaced from the bottom of the cavity at a distance of at least about one half said predetermined length so that a strip of food may be hung over said support surface with its end portions extending into said cavity to cause liquid released in the cooking process to be directed into and contained in said cavity.

2. A disposable structure according to claim 1 wherein said structure includes a plurality of support portions; said base portion has parallel side walls; said support portions each are generally T-shaped, include a bottom part having spaced edges adapted to extend adjacent the inner surfaces of said side walls, and include a top part wider than and extending past said spaced edges of said bottom part adapted to engage and be supported by said top surface of said base portion with said support portion extending transversely between said side walls; and said support surface comprises the edge surface of said top part opposite said bottom part.

3. A disposable structure according to claim 2 wherein each of said support portions is formed from a single sheet of paper adapted to be folded into a V-shape about a fold line at the edge of said bottom part opposite said top part so that said top part has two spaced edges defining said support surface and two spaced edges engaging the top surface of each of said side walls.

4. A disposable structure according to claim 1 wherein said support portion is ladder-like, having spaced parallel parts defining a plurality of support surfaces and having parts at the opposite ends of said parallel parts adapted to be supported on the top surface of said base portion.

5. A disposable structure according to claim 1 wherein said support portion includes two rectangular planar parts joined to each other and adapted to be folded along a common edge, which common edge defines said support surface, said planar parts being adapted to be disposed at an cute angle and having their edges opposite said common edge supported on said base portion within said cavity.

6. A structure according to claims 1, 3 or 5 wherein said base portion is adapted to be folded from a flat to a rectangular shape to define the shape of said cavity.

7. A disposable structure adapted for cooking strips of food such as bacon that give off liquids in the cooking process in a microwave oven, said structure comprising:
   a nonmetallic base portion having parallel side walls, a top surface and a cavity recessed from said top surface of a size adapted to at least contain liquid released from the strips; and
   a plurality of support portions formed of stiff paper each being generally T-shaped, including a bottom part having spaced edges adapted to extend adjacent the inner surfaces of said side walls, and including a top part wider than and extending past said spaced edges of said bottom part adapted to engage and be supported by said top surface of said base portion with said support portion extending transversely between said side walls and with the edge surface of said top part opposite said bottom part providing a support surface adapted to support said strips of food over said cavity.

8. A disposable structure according to claim 7 wherein each of said support portions is formed from a single sheet of paper adapted to be folded into a V-shape about a fold line at the edge of said bottom part opposite said top part so that said top part has two spaced edges defining said support surface and two spaced edges engaging the top surface of each of said side walls.

* * * * *